United States Patent
Fiedorowicz et al.

(10) Patent No.: US 7,770,108 B2
(45) Date of Patent: Aug. 3, 2010

(54) APPARATUS AND METHOD FOR ENABLING COMPOSITE STYLE SHEET APPLICATION TO MULTI-PART ELECTRONIC DOCUMENTS

(75) Inventors: Erik P. Fiedorowicz, Bayside, NY (US); John R. Hind, Raleigh, NC (US); Brad B. Topol, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 11/551,052

(22) Filed: Oct. 19, 2006

(65) Prior Publication Data
US 2008/0178072 A1 Jul. 24, 2008

Related U.S. Application Data

(63) Continuation of application No. 09/595,288, filed on Jun. 15, 2000, now Pat. No. 7,134,073.

(51) Int. Cl.
*G06F 17/00* (2006.01)
(52) U.S. Cl. ..................................... 715/236
(58) Field of Classification Search ................ 715/200, 715/234, 236, 235
See application file for complete search history.

(56) References Cited

U.S. PATENT DOCUMENTS

| | | | | |
|---|---|---|---|---|
| 5,899,975 A * | 5/1999 | Nielsen | ................... | 704/270.1 |
| 6,101,512 A * | 8/2000 | DeRose et al. | .............. | 715/234 |
| 6,584,480 B1 * | 6/2003 | Ferrel et al. | .................. | 715/205 |
| 6,589,291 B1 * | 7/2003 | Boag et al. | ................... | 715/235 |
| 6,605,120 B1 * | 8/2003 | Fields et al. | ................. | 715/239 |
| 6,715,129 B1 * | 3/2004 | Hind et al. | ................... | 715/239 |
| 6,769,096 B1 * | 7/2004 | Kuppusamy et al. | ......... | 715/234 |
| 6,792,577 B1 * | 9/2004 | Kimoto | ...................... | 715/235 |
| 7,117,429 B2 * | 10/2006 | Vedullapalli et al. | ........ | 715/235 |
| 7,251,778 B1 * | 7/2007 | Hill et al. | ..................... | 715/210 |
| 7,506,247 B2 * | 3/2009 | McKnight et al. | ........... | 715/236 |
| 2002/0010716 A1 * | 1/2002 | McCartney et al. | ......... | 707/517 |
| 2002/0087601 A1 * | 7/2002 | Anderson et al. | ........... | 707/515 |
| 2002/0103908 A1 * | 8/2002 | Rouse et al. | ................. | 709/227 |
| 2003/0084405 A1 * | 5/2003 | Ito et al. | ..................... | 715/513 |
| 2005/0159136 A1 * | 7/2005 | Rouse et al. | ............. | 455/412.1 |
| 2006/0036964 A1 * | 2/2006 | Satterfield et al. | ........... | 715/777 |

OTHER PUBLICATIONS

Jourdan et al., A New Step Towards Multimedia Documents Generation, Google 2001, pp. 1-4.*

* cited by examiner

*Primary Examiner*—Cong-Lac Huynh
(74) *Attorney, Agent, or Firm*—Kunzler Needham Massey & Thorpe

(57) ABSTRACT

An apparatus and method for enabling composite style sheet application to multi-part electronic documents is provided. The apparatus and method identify content of a requested electronic document and determine subset style sheets that correspond to the identified content. Certain ones of these subset style sheets are selected based on, for example, requesting device characteristics, for use in generating a composite style sheet. The selected subset style sheets are then merged with a global style sheet to generate a composite style sheet that may be applied to the electronic document for proper presentation on a requesting device.

20 Claims, 9 Drawing Sheets

```
<?xml version = "1.0">
<xsl:stylesheet xmlns:xsl = "http://www.w3.org/TR/WD-xsl">
<xsl:template match = "/">
<!--prefix global here-->
        <HTML> <HEAD> <TITLE> In The News </TITLE> </HEAD> <BODY>
<xsl:for-each select = "./doc/*">
        <!--subset prefix here>
        <xsl:apply-template select = "."/>
        <!--subset postfix here>
</xsl:for-each>
<!--postfix global here-->
        </BODY> </HTML>
</xsl:template>
<!--merge subset style sheets here-->
</xsl:stylesheet>
```

Figure 5

```
<?xml version = "1.0">
<xsl:stylesheet xmlns:xsl = "http://www.w3.org/TR/WD-xsl">
<xsl:template match = "/">
        <H1> WRAL News 5 Traffic Report for
        <xsl:value-of select = "traffic/tdate"/>
        <xsl:value-of select = "traffic/time"/>
        </H1>
        <for-each select = "traffic/tentry" order-by "time">
        <xsl:apply-templates select = "."/>
        </xls:for-each>
</xsl:template>
<xsl:template match = "traffic/tentry">
        <P>
        <xsl:value-of select = "./time"/>
        <xsl:value-of select = "./report"/>
        </P>
</xsl:template>
<xsl:stylesheet>
```

Figure 6

```
<?xml version = "1.0">
<xsl:stylesheet xmlns:xsl = "http://www.w3.org/TR/WD-xsl">
<xsl:template match = "/">
<!--prefix global here-->
        <HTML> <HEAD> <TITLE> In The News </TITLE> </HEAD> <BODY>
<xsl:for-each select = "./doc/*">
        <!--subset prefix here>
        <xsl:apply-template select = "."/>
        <!--subset postfix here>
</xsl:for-each>
<!--postfix global here-->
        </BODY> </HTML>
</xsl:template>
<xsl:template match = "doc/traffic">
        <H1> WRAL News 5 Traffic Report for
        <xsl:value-of select = "traffic/tdate"/>
        <xsl:value-of select = "traffic/time"/>
        </H1>
        <for-each select = "traffic/tentry" order-by "time">
        <xsl:apply-templates select = "."/>
        </xls:for-each>
</xsl:template>
<xsl:template match = "doc/traffic/tentry">
        <P>
        <xsl:value-of select = "./time"/>
        <xsl:value-of select = "./report"/>
        </P>
</xsl:template>
</xsl:stylesheet>
```

Figure 7

```xml
<?xml version = "1.0"?>
<xsl:stylesheet xmlns:xsl="http://www.w3.org/XSL/Transform/1.0">
<xsl:template match = "/">
        <!--prefix global here-->
        <wml>
        <xsl:variable name="count">1</xsl:variable>
        <xsl:for-each select="./Flights/*">
                <!--subset prefix here-->
                <xsl:text>
                </xsl:text>
                <xsl:text disable-output-escaping="yes"><card>
                id="card</xsl:text><xsl:value-of select="$count"/>
                <xsl:text disable-output-escaping="yes">"
                </xsl:text>
                <do type="accept" label="Next">
                <xsl:text disable-output-escaping="yes"><go>
                href="card</xsl:text><xsl:value-of select=$count+1"/>
                <xsl:text disable-output-escaping="yes">"</xsl:text>
                </do>
                        <xsl:apply-templates select="."/>
                        <!--subset postfix here-->
                        <xsl:variable name="count">
                        <xsl:value-of select="$count+1"/>
                        </xsl:variable>
                        <xsl:text disable-output-escaping="yes"></card></xsl:text>
        </xsl:for-each>
        <!--postfix global here-->
        <xsl:text>
        </xsl:text>
        <xsl:text disable-output-escaping="yes"><card>
        id="card</xsl:text><xsl:value-of select="$count"/><xsl:text disable-output-
        escaping="yes">"</xsl:text>
        <P> DONE </P>
        <xsl:text disable-output-escaping="yes">7lt;/card></xsl:text>
        <xsl:text>
        </xsl:text>
        </wml>
                <!--merge subset style sheets here-->
        </xsl:template>
        <xsl:template match = "Flights/AirCarrier">
                <p>
                <b><xsl:text>Airline: </xsl:text></b>
                <xsl:value-of select="."/>
                </p>
        </xsl:template>
        <xsl:template match = "Flights/FlightNumber">
                <p>
                <b><xsl:text>Flight No: </xsl:text></b>
                <xsl:value-of select="."/>
                </p>
        </xsl:template>
        <xsl:template match = "Flights/FlightSegment">
        </xsl:template>
<xsl:stylesheet>
```

Figure 8

APPARATUS AND METHOD FOR ENABLING COMPOSITE STYLE SHEET APPLICATION TO MULTI-PART ELECTRONIC DOCUMENTS

RELATED APPLICATIONS

This application is a continuation of application Ser. No. 09/595,288, filed Jun. 15, 2000, now U.S. Pat. No. 7,134,073.

The present invention is related to and commonly assigned U.S. patent application Ser. No. 09/287,988 entitled "Retrieval of Style Sheets from Directories Based Upon Partial Characteristic Matching," filed Apr. 8, 1999, which is hereby incorporated by reference.

BACKGROUND OF THE INVENTION

1. Technical Field

The present invention is directed to an apparatus and method for enabling composite style sheet application to multi-part electronic documents.

2. Description of Related Art

A "style sheet" is a specification of a style that is to be used when presenting a document. The style specification includes information such as the font and margins to be used, the formatting layout, and other types of information that indicate how the presented document should appear. Style sheets can be used for many types of presentation of a document, including printing the document, displaying it on a video display, processing the document by a speech synthesizer, etc. Consequently, style sheets may also be utilized to describe transformations from one document type to another (e.g. from MathML to HTML) or as filters which describe transformations to reduce the amount of content while maintaining the original document type.

One type of style sheet is an XSL Style Sheet. XSL Style Sheets are style sheets specified in the eXtensible Stylesheet Language (XSL). An XSL Style Sheet specifies how an eXtensible Markup Language (XML) document is to be transformed for presentation, resulting in a different document which may or may not maintain the original document type. XML is a standardized formatting notation, created for structured document interchange on the World Wide Web (hereinafter, "Web"). (Refer to "Extensible Markup Language (XML), W3C Recommendation 10 Feb. 1998" which is available on the World Wide Web at http://www.w3.org/TR/1998/REC-xml-19980210, for more information on XML; and to "Extensible Stylesheet Language (XSL), Version 1.0, World Wide Web Consortium Working Draft 16-Dec.-1998", hereinafter "XSL Specification", which is available on the Web at http://www.w3.org/TR/WD-xsl, for more information on XSL.)

Style sheets include "template rule" constructs, which define an input pattern and a template (also known as an "action") to use in creating an output result tree fragment. When applying a style sheet, the patterns in the templates are matched against the syntax of the source document. When a match is found with the template pattern, an output document fragment is created according to the actions specified in the template (which may include processing additional elements in the source document beyond the matching element). The source document is parsed recursively, until no more matching patterns are found. The resulting document fragments are then aggregated to yield a complete output document. (For more information on this process, refer to section 2, "Tree Construction", in the XSL Specification.) It is this template matching and substitution of different document elements according to the actions in the matching rules that enables style sheets to transform documents.

While the term "document" is used herein when discussing encoded data and application of style sheets thereto, it is to be understood that the information on which a style sheet operates may represent any type of information, and is not limited to the traditional interpretation of the word "document". As one example, a style sheet may be used to process an encoded representation of records from a data repository which specify a company's sales data. As another example, a style sheet may be used to format employee information retrieved from a corporate database for presentation. For ease of reference, the term "document" will be used herein to refer to these diverse types of information.

XML is emerging as a powerful methodology for representing document content, due to its ability to store data in a self-defining, portable manner. A large number of XML-based markup languages have recently emerged. XML-based markup languages have been utilized to represent airline reservation information, weather information, news information, vertical industry and internal company data content, and the like. Examples of recently defined markup languages include Channel Definition Format (CDF), trading partner agreement Markup Language (tpaML) and content Synchronization Markup Language (SynchML).

Style sheet languages such as XSL, along with their associated processors, are powerful tools for filtering data content encoded in notations such as XML, as well as for formatting XML-based documents into a variety of rendering markup languages, such as HyperText Markup Language (HTML), Wireless Markup Language (WML), Handheld Device Markup Language(HDML) and Voice-XML. For example, style sheets may be written to search for and extract a specific subset of the information contained in the XML document. In addition, a style sheet might tailor the information so that it can be delivered to a particular device, transforming the document for the characteristics of the device (such as which browser will be used to render the document, the screen size of the device, whether the screen supports color or gray scale, etc.).

The need to perform this type of content tailoring is increasing rapidly as the popularity of new types of computing devices, such as pervasive computing devices, increases. Pervasive computing devices are typically small, constrained-storage devices such as "Smart Phones" or the Work-Pad device from the International Business Machines Corporation (IBM). ("WorkPad" is a registered trademark of IBM.) These devices are typically designed to be portable, and therefore are often connected to a network using a relatively expensive wireless connection, which may have limited bandwidth.

Pervasive computing devices are often quite different from the devices an end-user might use in an office setting, such as a desktop computer. For example, the display screen on the devices may be quite small, and may not support color display, audio, etc. Thus, XML documents which were originally created with the expectation that the document would be rendered on a full-function desktop computer may contain a significant amount of content that cannot be presented to the user of the smaller, low-end device. In fact, when a document includes large objects such as image, video, or audio files, it is quite possible that the low-end device will not have sufficient storage space to even receive the document.

As the number of XML-based content markup languages proliferates, and the desire of companies to provide personalized portal sites increases, XML transcoding developers are being required to create a much larger number of style sheets than were required in their non-portal based projects. This explosion in the number of stylesheets required to be written is due to the fact that for each desired subset combination of XML-based content streams that one desires to transcode, a specific style sheet must be created.

For example, suppose a portal site provides content for news, sports, weather and stocks. Now suppose one group of users only desires news, sports and stocks and another group of users desires news, weather and stocks. In order to support both of these groups of users, a separate stylesheet needs to be created for each group. Moreover, each group may make use of many different types of devices on which to receive this content. Thus, the portal site must have a style sheet for each group for each device or a very large parameterized stylesheet needs to be created (also typically done on a per device basis).

Both of the above approaches result in a proliferation of style sheets that are monolithic in nature, not very modular, and poorly suited to extensibility. For example, suppose after a group for news, sports and stocks is created and a group for news, weather and stocks is created, a new XML datastream providing company highlights is desired to be added to the groups. To provide this new XML datastream, a developer must go back and look at the formerly created style sheets and augment these style sheets to support the new datastream. Such an approach is extremely time consuming, costly, and could result in introducing sources of error into the legacy style sheets.

Thus, it would be beneficial to have an apparatus and method for creating simple style sheets that describe standard subsets of content which can be combined into a composite style sheet for a desired datastream.

SUMMARY OF THE INVENTION

The present invention provides an apparatus and method for enabling composite style sheet application to multi-part electronic documents. The apparatus and method identify content of a requested electronic document and determine subset style sheets that correspond to the identified content. Certain ones of these subset style sheets are selected based on, for example, requesting device characteristics, for use in generating a composite style sheet. The selected subset style sheets are then merged with a global style sheet to generate a composite style sheet that may be applied to the electronic document for proper presentation on a requesting device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is an exemplary diagram illustrating a global "documentroot" style sheet;

FIG. 6 is an exemplary diagram illustrating a subset style sheet;

FIG. 7 is an exemplary diagram illustrating a composite style sheet generated from the global style sheet and the subset style sheets of FIGS. 5 and 6;

FIG. 8 is an exemplary diagram illustrating a composite style sheet for a WML-based document.

DETAILED DESCRIPTION OF THE PREFERRED EMBODIMENT

Figure 1:
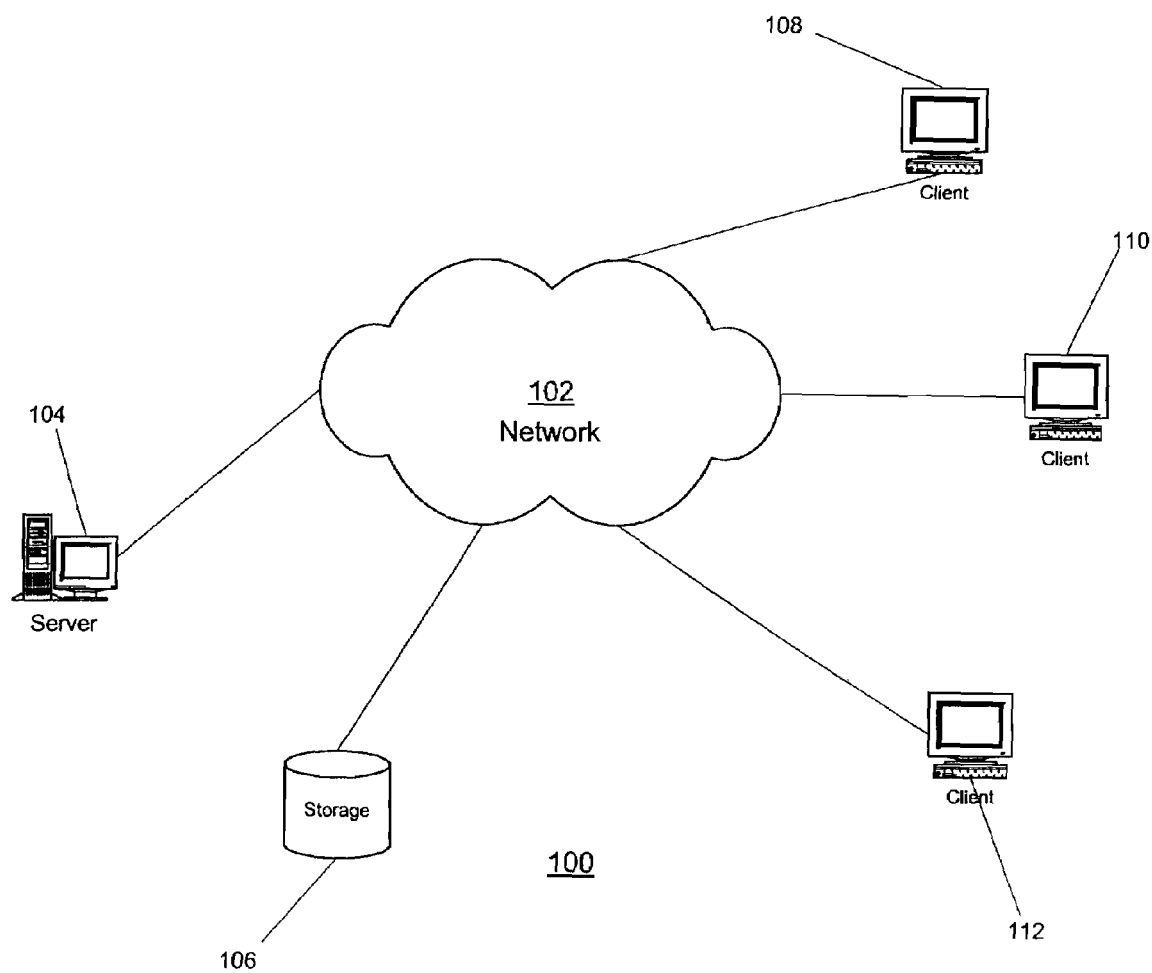
FIG. 1 is an exemplary block diagram of a distributed data processing system in which the present invention may be implemented.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

Figure 2A:
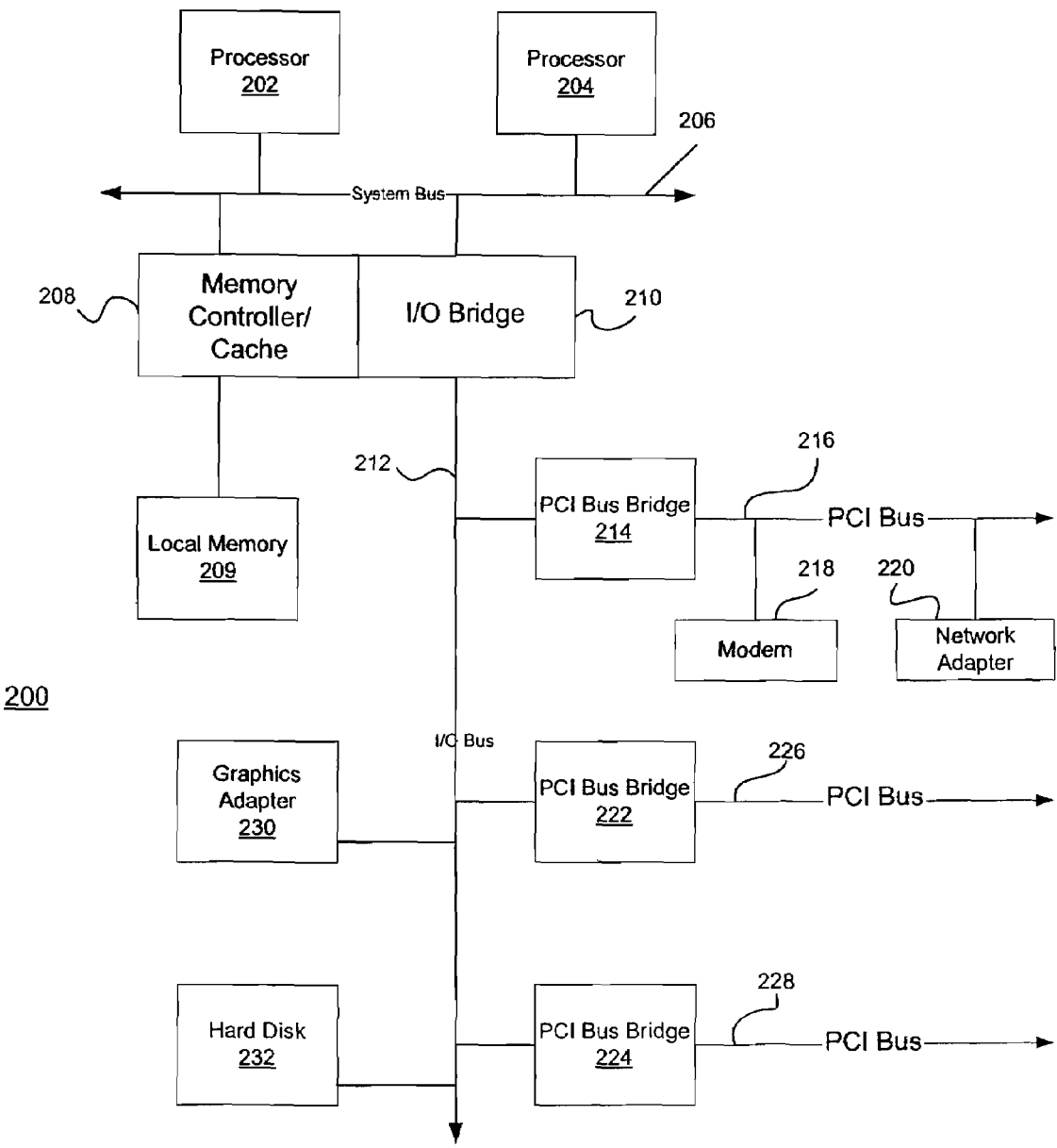
FIG. 2A is an exemplary block diagram of server in which the present invention may be implemented.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
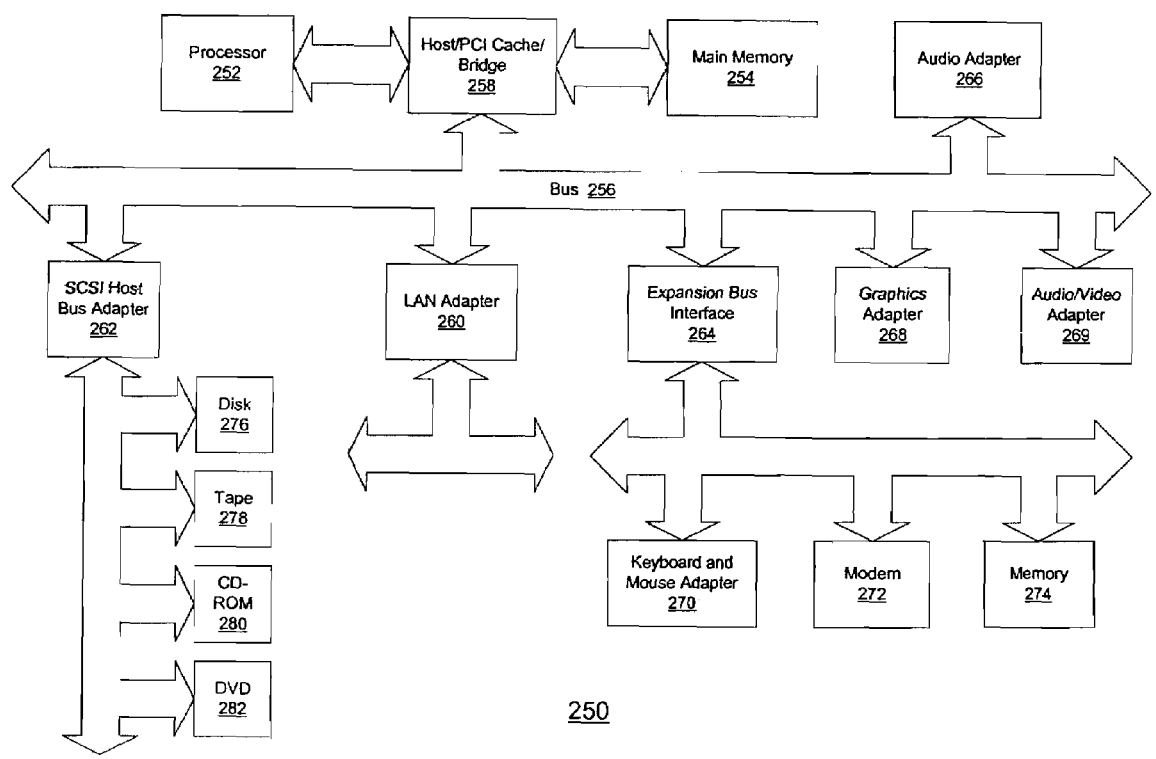
FIG. 2B is an exemplary block diagram of a client device in which the present invention may be implemented.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards.

In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as Java OS or OS/2, which are available from International Business Machines Corporation. Java OS is loaded from a server on a network to a network client and supports Java programs and applets. An object oriented programming system, such as Java, may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a mechanism by which subset style sheets are used to generated composite style sheets for use in formatting XML-based documents. The subset style sheets are created for each type of client device. Thus, for example, there may be four style sheets for the subset "news," each one of the four style sheets being directed to a particular type of client device.

The subset style sheets may be combined in any number of different combinations to generate a composite style sheet. Thus, by defining a small number of subset style sheets, a large number of composite style sheets may be generated. Furthermore, these composite style sheets may be generated on an as needed basis. Thus, when an XML-based document is requested by a client device, a composite style sheet may be generated for that particular XML-based document during the process of providing the XML-based document to the client device.

Co-pending and commonly assigned U.S. patent application Ser. No. 09/287,988 issued as U.S. Pat. No. 6,463,440 on Oct. 8, 2002) entitled "Retrieval of Style Sheets from Directories Based Upon Partial Characteristic Matching," filed Apr. 8, 1999, which is hereby incorporated by reference describes a method of tagging style sheets in a repository, such as a directory, with characteristic values allowing a style sheet processor to retrieve a set of best match sheets based on these characteristic values. In this invention this mechanism may be used to classify subset style sheets and to allow retrieval of the proper group of subset style sheets which will be merged together to generate an appropriate composite style sheet.

In particular, the present invention extends this mechanism by reserving a characteristic identifier whose value is a subset name which corresponds to a value of an element name which is one of the first level children of the XML document being processed. Each variation of the subset style sheet, for various devices and the like, is stored and indexed by respective characteristic strings, including this characteristic identifier, in the respective repository or directory for retrieval.

In addition to each subset style sheet for the particular subsets, a global style sheet may be designated for each supported device. This global style sheet, in the exemplary embodiments herein, is referred to using a reserved characteristic value. For the purposes of explanation herein, this value is shown as the string "documentroot," but any reserved value could be used in practice. A default "documentroot" style sheet may exist or may be generated by the transcoding process dynamically for use when a "documentroot" style sheet does not exist in the style sheet repository matching the set of characteristics needed for a particular client.

These subset style sheets are stored in a style sheet repository or directory. When a document is requested by a client device, the XML-based document data is parsed to determine the element names of the first level children. These, in conjunction with other characteristics such as those describing device capabilities, are used to retreive a group of subset style sheets which are merged and used in the transcoding/formatting process performed on the requested XML-based document.

Figure 3:
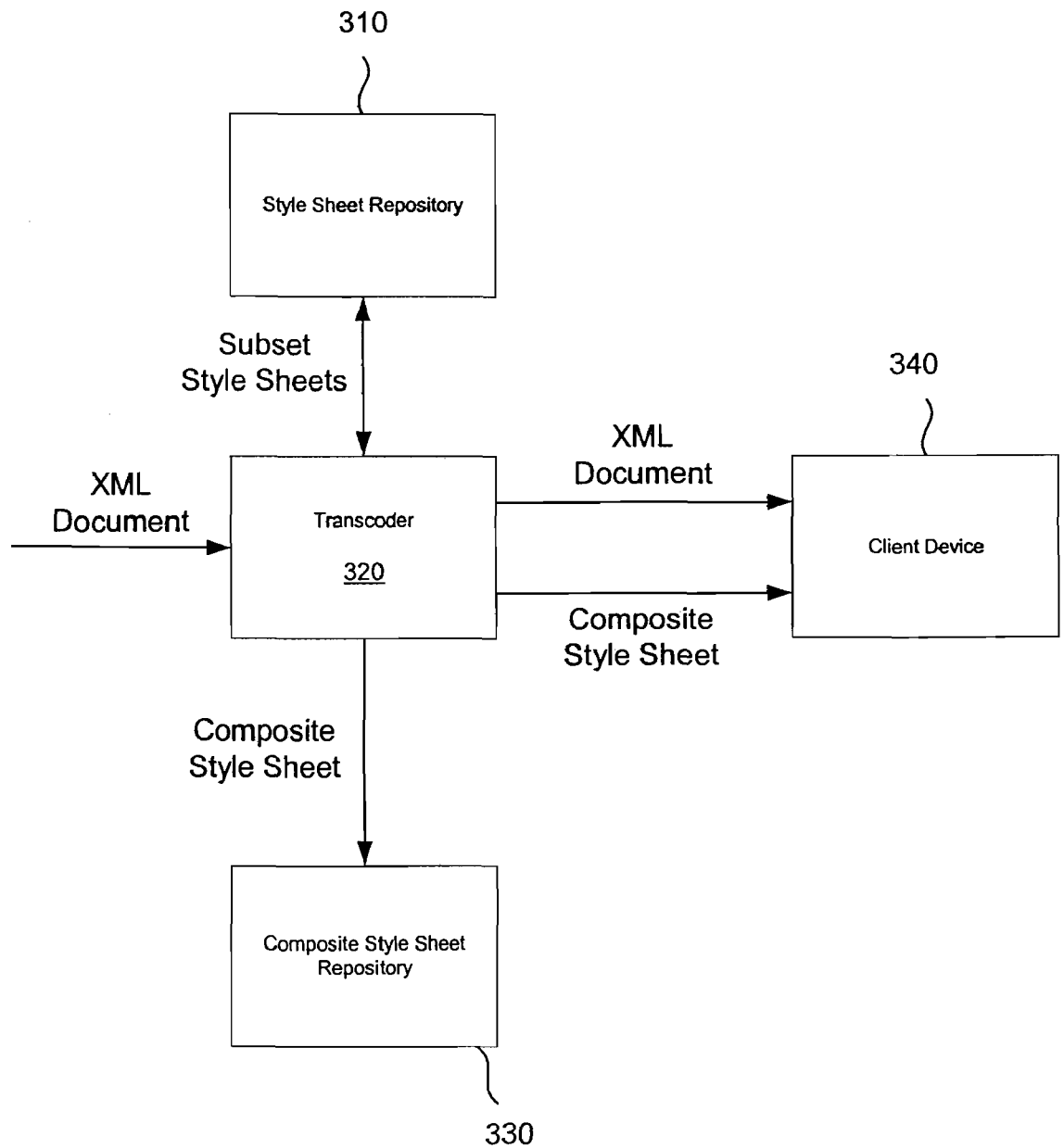
FIG. 3 is an exemplary block diagram illustrating a flow of data in accordance with the present invention.

FIG. 3 is an exemplary block diagram illustrating the process for generating a composite style sheet in accordance with the present invention. As shown in FIG. 3, the principle elements used to generate a composite style sheet are the style sheet repository 310, the transcoder 320, the composite style sheet repository 330, and the client device 340. The composite style sheet repository is an optional element which may or may not be used, depending on the particular implementation. However, for purposes of explaining all of the features of the present invention, it will be assumed that a composite style sheet repository is being utilized.

The elements 310-330 are preferably located on a server, such as server 200. However, some or all of the elements 310-330 may be distributed amongst a plurality of devices linked via a network, such as network 102. Furthermore, although not shown in the particular embodiment in FIG. 3, some of these elements, such as the transcoder 320 and composite style sheet repository 330, may also be located on the client device 340 itself.

In addition, the elements 310-330 may be hardware devices, software devices, or a combination of hardware and software. For purposes of illustration, the preferred embodiments will be described in terms of the elements themselves regardless of whether these elements are embodied in hardware or software. However, those of ordinary skill in the art will appreciate that in a software based embodiment, the software based functions of the present invention will be implemented as software running on a processor. Thus, the sending and receiving of data will be performed by physical links with functions being performed on the data by the software executing on the processor(s).

When the client device 340 sends a request message for a particular document, the server will pass the document to the transcoder 320. This document will hereafter be refer to as an "XML document," however, those skilled in the art will understand that the document may be in any format which can be parsed into a Document Object Model (DOM) tree structure having first level children elements corresponding to subset styles.

The transcoder 320 parses the XML document into a DOM tree structure and examines the first level child elements to determine the values of the reserved characteristic identifier which will be included in the query to the style sheet repository 310 and/or the composite style sheet repository 330. For example, if the XML document includes "news" and "traffic" information as first level children elements, the subset style sheets for "news" and "traffic" information are identified. There may be multiple subset style sheets for each of "news" and "traffic" that are identified being differentiated from one another by other characteristic values corresponding to possible device characteristics of the client device 340.

After checking the optional composite style sheet repository 330 and not finding an existing merged composite sheet that could be used to satisfy the request, the transcoder 320 retrieves the relevant subset style sheets from the style sheet repository 310.

The transcoder 320 determines which ones of the multiple style sheets to use in generating a composite style sheet. This determination is made based on the device type of the client device 340 requesting the XML document and the client device's particular characteristics as well as on the first level child element names found in the XML document. The transcoder 320 also attempts to retrieve a "documentroot" global stylesheet matching the client device 340 characteristics from the style sheet repository. If none is found, the transcoder 320 generates or retrieves a default global style sheet.

Once the global style sheet (documentroot) and relevant subset style sheets have been retrieved, the transcoder 320 combines these style sheets into a merged composite style sheet in a manner to be described more fully hereafter. The composite style sheet is then placed in the optional composite style sheet repository indexed by the respective set of characteristics to speed the process if the same kind of client device 340 makes repeated requests for documents having the same first level children element names.

Next, the transcoder 320 determines if the client device 340 is capable of rendering the XML document using the composite style sheet. If the client device can perform this function, then the transcoder 320 sends the XML document to the client device with a reference to the composite style sheet. The client device retrieves the composite style sheet and renders the document as appropriate on the client device.

If the client device is not capable of applying the composite style sheet to the document, then the transcoder 320 processes the XML document using the composite style sheet and sends the resulting document, e.g., in HTML format, WML format, or the like, to the client device.

Figure 4:
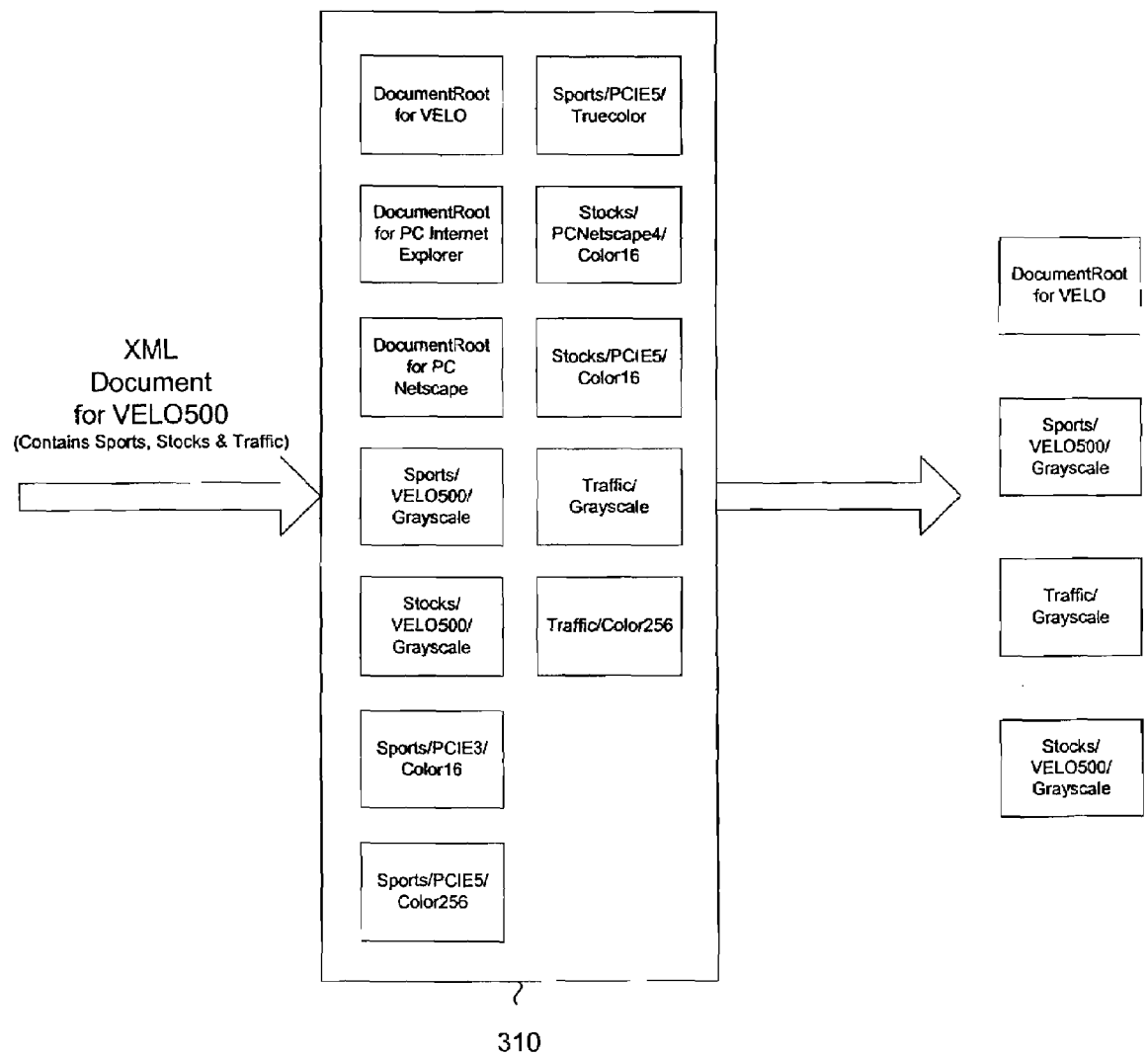
FIG. 4 is an exemplary block diagram illustrating an alternative embodiment for retrieving subset style sheets from a subset style sheet repository.

FIG. 4 is an exemplary block diagram illustrating an alternative mechanism for retrieving subset style sheets from the subset style sheet repository 310. In the embodiment described with reference to FIG. 4, all subset style sheets for subsets in the XML document are retrieved from the subset style sheet repository 310 and the transcoder 320 determines which of these is to be used in the composite style sheet based on device type and device characteristics of the requesting client device. In an alternative embodiment, as shown in FIG. 4, only the subset style sheets corresponding to the subsets in the XML document and the particular device type and/or device characteristics, are retrieved from the subset style sheet repository 310. In other words, the determination of which subset style sheets to use in the composite style sheet is made at the same time as the determination of which subset style sheets to retrieve from the subset style sheet repository 310.

For example, as shown in FIG. 4, if an XML document containing sports, stocks and traffic information is requested by a VELO500 client device, only those subset style sheets for sports, stocks and traffic corresponding to the VELO500 device are retrieved from the subset style sheet repository 310. The transcoder 320 then receives these retrieved subset style sheets and combines them into a composite style sheet in a manner to be described hereafter.

In either embodiment of FIG. 3 or FIG. 4, if specific subset style sheets for a particular device are not found in the subset style sheet repository 310, the closest match style sheets for the particular device are retrieved. A determination of the closest match may be based on a set of predetermined rules maintained by the computing device on which the present invention is implemented.

For purposes of the following description of the present invention, it will be assumed that the embodiment described with respect to FIG. 3 is being utilized. However, one of ordinary skill in the art will appreciate that the functions performed by the transcoder 320 in selecting the particular subset style sheets for use in generating the composite style sheet may be performed when retrieving the subset style sheets from the subset style sheet repository 310 in the manner described with reference to FIG. 4.

As described above, the first step in generating a composite style sheet for use in presenting a requested XML document is to determine the subset style sheets to be retrieved from the subset style sheet repository 310. This retrieval may be performed in a manner similar to that described in the incorporated co-pending and commonly assigned U.S. patent application Ser. No. 09/287,988 issued as U.S. Pat. No. 6,463,440 on Oct. 8, 2002).

In particular, a characteristic identifier is reserved for which a value is the subset name corresponding to the XML document's first level children element name which the subset style sheet is able to render. Each variation of the subset style sheet for various devices and the like, is stored with the respective characteristic strings including this characteristic identifier in the respective repository or directory for retrieval. Additionally, a global style sheet may be designated for each supported device having a characteristic value of "documentroot."

For example, assuming the chosen subset characteristic identifier is "SUBSETSTYLE", the subset style sheet repository 310 may contain several subset style sheets with (highly simplified) characteristic strings of the type:

/SUBSETSTYLE.DOCUMENTROOT/DEVICE.VELO/
/SUBSETSTYLE.DOCUMENTROOT/DEVICE.PCIE/
/SUBSETSTYLE.DOCUMENTROOT/DEVICE.PCNETSCAPE/
/SUBSETSTYLE.SPORTS/DEVICE.VELO500/DISPLAY.GRAY/
/SUBSETSTYLE.STOCKS/DEVICE.VELO500/DISPLAY.GRAY/
/SUBSETSTYLE.SPORTS/DEVICE.PCIE3/DISPLAY.COLOR16/
/SUBSETSTYLE.SPORTS/DEVICE.PCIE5/DISPLAY.COLOR256/
/SUBSETSTYLE.SPORTS/DEVICE.PCIE5/DISPLAY.TRUECOLOR/
/SUBSETSTYLE.STOCKS/DEVICE.PCIE5/DISPLAY.COLOR16/
/SUBSETSTYLE.STOCKS/DEVICE.PCNETSCAPE4/DISPLAY.COLOR16/
/SUBSETSTYLE.TRAFFIC/DISPLAY.GRAY/
/SUBSETSTYLE.TRAFFIC/DISPLAY.COLOR256/

The transcoder 320 retrieves the above subset style sheets corresponding to the subsets that exist in the XML document, for example "SPORTS" and "TRAFFIC" along with the "documentroot" subset style sheets. The transcoder 320, knowing the client device characteristics, for example a Microsoft Internet Explorer browser running on a PC with a 256 color screen, then determines which of the subset style sheets is a best match for each subset based on the characteristics of the requesting client device. In the example above, this means that the style sheets with the following characteristics would be selected:

/SUBSETSTYLE.DOCUMENTROOT/DEVICE.PCIE/
/SUBSETSTYLE.SPORTS/DEVICE.PCIE5/DISPLAY.COLOR256/
/SUBSETSTYLE.TRAFFIC/DISPLAY.COLOR256/

Once the subset style sheets and appropriate global documentroot (which may have been generated if it was not present in the stylesheet repository) are identified for use in generating the composite style sheet, the subset style sheets need to be merged into the global documentroot.

FIG. 5 is an exemplary diagram illustrating a documentroot style sheet. The documentroot style sheet defines the global format of the XML document. For example, as shown in FIG. 5, the documentroot style sheet defines such elements as the "boiler plate" heading information in a web page, such as <html> <head>, <title> and <body> tags and the transitions between the subset style sheets. The subset style sheets are merged into the documentroot style sheet at the location marked with the string "<!--merge subset style sheets here-->" in FIG. 5.

The merge operation consists of taking each of the subset style sheets, converting the root template they contain to a child template, adjusting the match phrases of embedded child templates and references, and inserting this subset style sheet into the documentroot style sheet following the root template of the documentroot style sheet. This process will be described in greater detail with reference to FIG. 6 which shows an exemplary "traffic" subset style sheet.

As shown in FIG. 6, the traffic subset style sheet contains an XSL template match 610 that is set to the a root template "/". This is because each traffic subset style sheet is itself the highest template in the hierarchy of templates until the subset style sheet is combined with other subset style sheets in the documentroot style sheet. When the subset style sheet is merged with the documentroot style sheet, this template must be modified to reflect the template of the subset style sheet being a child of the root template. The root template, in the particular embodiment shown in FIG. 6, is the "doc" template. Thus, the "/" in the XSL template match 610 must be replaced with "doc/traffic" since the subset style sheet is a "traffic" subset style sheet.

Further, the traffic template contains an XSL template match for an embedded child template 620. This XSL template match must also be modified to reflect the traffic subset style sheet being a child of the documentroot style sheet. Thus, the "traffic/tentry" reference to the embedded child template 620 must be replaced with "doc/traffic/tentry." Once these replacements are made, along with any other similar replacements that may be necessary depending on the particular subset style sheet, the subset style sheet may be inserted into the documentroot style sheet following the root template of the documentroot style sheet.

FIG. 7 is an example of a composite style sheet generated in the manner set forth above. As shown in FIG. 7, the XSL template match 610 and the reference to the embedded child template 620 have been replaced in the manner described above. This composite style sheet now provides both global formatting and traffic subset formatting for an XML document containing traffic information.

This composite style sheet may then be applied, in a manner generally known in the art, to an XML document so that the XML document is properly formatted for presentation on a client device. In this way, a customized presentation of an XML document may be provided to a user of the requesting client device without having to have a specific style sheet stored for the particular XML document a priori.

FIG. 8 is an example of another composite style sheet that is generated in the manner set forth above but is based on the Wireless Markup Language (WML). As shown in FIG. 8, the generated root template follows the basic pattern but includes a prefix/postfix glue that generates cards from the merged subset style sheets. A card is a WML concept of a unit of displayable information where the overall WML document may be thought of as a "card deck" which the end user can view a "card" at a time on a supporting device such as a cell phone.

In the example shown in FIG. 8, the root is "Flights" with the subset style sheets being "AirCarrier," "FlightNumber," and "FlightSegment." These subset style sheets may be identified in the same manner as describe above, e.g., based on the particular XML document requested and the characteristics of the requesting client device which in this case supports WML documents.

When the composite style sheet is applied to a sample XML document the result is a WML document that looks like the following:

```
<wml>
<card> id = "card1"<do type = "accept" label = "Next"><go>
href = "card2"</do><p><b>Airline: </b>AA</p></card>
<card> id = "card2"<do type = "accept" label = "Next"><go>
href = "card3"</do><p><b>Flight No: </b>700</p></card>
<card> id = "card3"<do type = "accept" label = "Next"><go>
href = "card4"</do><p><b>Airline: </b>Delta</p></card>
<card> id = "card4"<do type = "accept" label = "Next"><go>
href = "card 5"</do></card>
<card> id = "card5" <P> DONE </P></card>
</wml>
```

Notice that each "card" in the above WML document contains navigation information allowing the viewer to step though the deck of cards representing the entire document. This means that in this example the prefix/postfix WML in the documentroot style sheet is essentially a generic card generation markup that turns each subset style sheet into a WML card with navigation. This resulting output may be used by a wireless device, such as an Internet compatible cellular telephone or the like, to provide a customized display to the user of he cellular telephone in a way that segments the information into small units viewable on the tiny screen of the device.

Thus, the present invention provides a mechanism by which a developer can write subset style sheets as modular, reusable, and composable components instead of constantly going back and extending legacy monolithic style sheets. In addition, the number of style sheets that must be written to provide support for all devices and combinations of XML document content is reduced thereby reducing the cost of providing customizable XML document content as well as reducing the cost of storing style sheets used to provide customized XML documents. Finally, the present invention illustrates how the modular subset stylesheets can be written without the need to take into account the generation card-based navigation markup used by the Wireless Markup Language and Handheld Device Markup Language.

Figure 9:
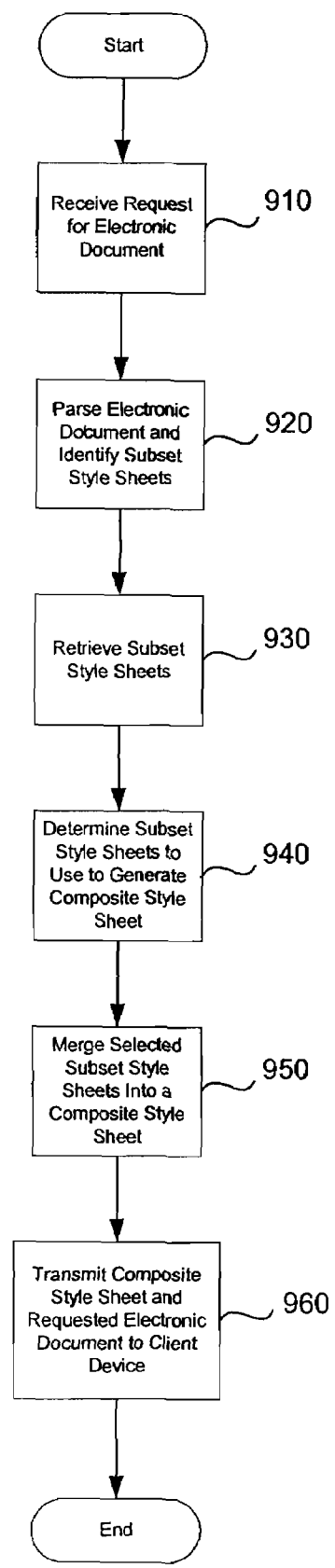
FIG. 9 is a flowchart outlining an exemplary operation of the present invention.

FIG. 9 is a flowchart outlining an exemplary operation of the present invention. As shown in FIG. 9, the operation starts with a request from a client device for an XML-based document (step 910). The requested XML-based document is parsed to identify the particular subset style sheets needed to generate a composite style sheet for the document (step 920). These subset style sheets are retreived from a subset style sheet repository (step 930).

From the retrieved subset style sheets, the subset style sheets for use in generating the composite style sheet are identified based on, for example, the characteristics of the requesting client device (step 940). These subset style sheets are then merged with a documentroot style sheet to generate a composite style sheet (step 950). The composite style sheet and the requested XML-based document are then downloaded to the client device (step 960) or processed directly by the transcoder with the results (for example a WML document for a cell phone) being downloaded to the client device. The operation then ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of generating a composite style sheet used for transforming an electronic document, comprising:

determining particular rendering characteristics and device type of a client device to which an electronic document is to be sent;

during processing of the electronic document, dynamically selecting, without user input, a plurality of subset style sheets based on identified subject-matter content of the electronic document, the particular rendering characteristics of the client device to which the electronic document is to be sent, and the device type of the client device to which the electronic document is to be sent, wherein the plurality of subset style sheets comprises a subset of available subset style sheets; and merging the plurality of selected subset style sheets to generate a composite style sheet.

2. The method of claim 1, wherein the plurality of subset style sheets includes a global style sheet and other subset style sheets, and wherein merging the plurality of subset style sheets includes inserting the other subset style sheets into the global style sheet to generate the composite style sheet.

3. The method of claim 2, wherein inserting the other subset style sheets of the plurality of subset style sheets into the global style sheet includes converting a root template in each of the other subset style sheets to a child template.

4. The method of claim 3, wherein inserting the other subset style sheets of the plurality of subset style sheets into the global style sheet further includes adjusting match phrases of embedded child templates and references in each of the other subset style sheets.

5. The method of claim 2, wherein the other subset style sheets are inserted following a root template of the global style sheet.

6. The method of claim 2, wherein the global style sheet includes electronic navigational information.

7. The method of claim 2, wherein the global style sheet includes a prefix/postfix glue that generates wireless markup language cards from the merged subset style sheets.

8. The method of claim 1, wherein selecting a plurality of subset style sheets includes parsing the electronic document into a document object model and examining first level child elements of the document object model in order to identify the subject-matter content of the electronic document that is used by the dynamically selecting step.

9. The method of claim 8, wherein selecting a plurality of subset style sheets further includes matching values of the first level child elements to characteristic identifiers of subset style sheets in a subset style sheet repository and selecting the plurality of subset style sheets from the subset style sheets in the subset style sheet repository based on whether the first level child element values match characteristic identifiers for the subset style sheets.

10. The method of claim 1, wherein the identified subject-matter content comprises at least one of news, sports, stocks and weather.

11. A method of generating a composite style sheet used for transforming an electronic document, comprising:
  selecting without user input a plurality of subset style sheets based on content of an electronic document, particular rendering characteristics of a client device to which the electronic document is to be sent, and device type of the client device to which the electronic document is to be sent, wherein the plurality of subset style sheets comprises a subset of available subset style sheets;
  merging the plurality of subset style sheets to generate a composite style sheet; and
  determining if the client device to which the electronic document is to be sent is capable of rendering the electronic document using the composite style sheet, and sending the electronic document to the client device with a reference to the composite style sheet in response to determining that the client device is capable of rendering the electronic document using the composite style sheet.

12. The method of claim 11, further comprising rendering the electronic document using the composite style sheet and sending the rendered electronic document to the client device, if the client device is not capable of rendering the electronic document using the composite style sheet.

13. The method of claim 11, wherein the content used in selecting the plurality of subset style sheets is subject-matter content comprising at least one of news, sports, stocks and weather.

14. An apparatus for generating a composite style sheet used for transforming an electronic document, comprising:
  a style sheet repository; and
  a transcoder coupled to the style sheet repository, wherein the transcoder determines particular rendering characteristics and device type of a client device to which an electronic document is to be sent and dynamically selects, without user input, during processing of the electronic document, a plurality of subset style sheets in the style sheet repository that correspond to the electronic document, based on identified subject-matter content of the electronic document, the particular rendering characteristics of the client device to which the electronic document is to be sent, and the device type of the client device to which the electronic document is to be sent, and merges the plurality of selected subset style sheets to generate the composite style sheet, wherein the plurality of subset style sheets comprises a subset of available subset style sheets;
  a processor for running the process performed by the transcoder.

15. The apparatus of claim 14, wherein the plurality of subset style sheets includes a global style sheet and other subset style sheets, and wherein the transcoder merges the plurality of subset style sheets by inserting the other subset style sheets into the global style sheet to generate the composite style sheet.

16. The apparatus of claim 15, wherein the transcoder inserts the other subset style sheets of the plurality of subset style sheets into the global style sheet by converting a root template in each of the other subset style sheets to a child template.

17. The apparatus of claim 16, wherein the transcoder inserts the other subset style sheets of the plurality of subset style sheets into the global style sheet by further adjusting match phrases of embedded child templates and references in each of the other subset style sheets.

18. The apparatus of claim 15, wherein the global style sheet includes a prefix/postfix glue that generates wireless markup language cards from the merged subset style sheets.

19. The apparatus of claim 14, wherein the transcoder selects the plurality of subset style sheets by parsing the electronic document into a document object model and examining first level child elements of the document object model in order to identify the subject-matter content of the electronic document that is used by the transcoder.

20. The apparatus of claim 19, wherein the transcoder selects the plurality of subset style sheets by further matching values of the first level child elements to characteristic identifiers of subset style sheets in the subset style sheet repository and selecting the plurality of subset style sheets from the subset style sheets in the subset style sheet repository based on whether the first level child element values match characteristic identifiers for the subset style sheets.

* * * * *